(12) United States Patent
Khelifa et al.

(10) Patent No.: US 9,506,701 B2
(45) Date of Patent: Nov. 29, 2016

(54) COLD AND/OR HEAT ACCUMULATOR

(75) Inventors: Noureddine Khelifa, Munich (DE); Wolfgang Krämer, Munich (DE); Steffen Korfmann, Ingolstadt (DE); Thomas Peters, Munich (DE)

(73) Assignee: WEBASTO AG, Stockdorf (DE)

( * ) Notice: Subject to any disclaimer, the term of this patent is extended or adjusted under 35 U.S.C. 154(b) by 2190 days.

(21) Appl. No.: 12/302,222

(22) PCT Filed: May 29, 2006

(86) PCT No.: PCT/DE2006/000922
§ 371 (c)(1),
(2), (4) Date: Jun. 5, 2009

(87) PCT Pub. No.: WO2007/137532
PCT Pub. Date: Dec. 6, 2007

(65) Prior Publication Data
US 2010/0018667 A1    Jan. 28, 2010

(51) Int. Cl.
| | |
|---|---|
| *F28D 17/00* | (2006.01) |
| *F28F 9/00* | (2006.01) |
| *F28D 1/047* | (2006.01) |
| *F28D 20/02* | (2006.01) |
| *F28F 21/02* | (2006.01) |
| *F28D 20/00* | (2006.01) |

(52) U.S. Cl.
CPC .............. *F28F 9/002* (2013.01); *F28D 1/0478* (2013.01); *F28D 20/023* (2013.01); *F28F 21/02* (2013.01); *F28D 2020/0013* (2013.01); *F28D 2020/0021* (2013.01); *F28F 2265/30* (2013.01); *Y02E 60/145* (2013.01)

(58) Field of Classification Search
USPC ................... 165/4, 10, 61, 65, 66, 144, 145, 165/162–166, 172, 173, 175, 176, 902; 62/5, 431, 434, 437
See application file for complete search history.

(56) References Cited

U.S. PATENT DOCUMENTS

| | | | | |
|---|---|---|---|---|
| 1,720,768 A | * | 7/1929 | Spreen | ............................ 62/406 |
| 2,402,802 A | | 6/1946 | Carter | |
| 2,756,970 A | * | 7/1956 | Hermann | ....................... 165/207 |
| 2,848,200 A | * | 8/1958 | Jacobs | ........................... 165/150 |
| 4,513,587 A | * | 4/1985 | Humpolik et al. | ............. 62/515 |
| 4,524,823 A | * | 6/1985 | Hummel et al. | ............... 165/174 |
| 4,531,380 A | * | 7/1985 | Hagen | ............................. 62/320 |

(Continued)

FOREIGN PATENT DOCUMENTS

| | | |
|---|---|---|
| DE | 3126838 | 5/1983 |
| DE | 4007002 | 9/1991 |

(Continued)

OTHER PUBLICATIONS

International Search Report dated Mar. 14, 2007.

*Primary Examiner* — Devon Russell
(74) *Attorney, Agent, or Firm* — Fitch, Even, Tabin & Flannery LLP

(57) ABSTRACT

A cold and/or heat accumulator has a first heat exchanger and preferably a second heat exchanger. The first heat exchanger may, in particular, be provided to be perfused by a refrigerant while the second heat exchanger is preferably perfused by brine. The first heat exchanger and preferably also the second heat exchanger are engaged in a heat-exchanging relationship with carrier elements charged with a cold or heat storage medium and may, in particular, be formed by graphite strips.

7 Claims, 2 Drawing Sheets

(56) References Cited

U.S. PATENT DOCUMENTS

| | | | |
|---|---|---|---|
| 4,543,802 A * | 10/1985 | Ingelmann et al. | 62/525 |
| 4,665,975 A * | 5/1987 | Johnston | 165/167 |
| 5,036,909 A * | 8/1991 | Whitehead et al. | 165/133 |
| 5,199,484 A | 4/1993 | Schatz | |
| 5,497,827 A * | 3/1996 | Cornic | 165/162 |
| 5,944,089 A * | 8/1999 | Roland | 165/10 |
| 6,101,830 A | 8/2000 | Feuerecker | |
| 6,892,803 B2 * | 5/2005 | Memory et al. | 165/165 |
| 6,959,758 B2 * | 11/2005 | Hughes et al. | 165/165 |
| 2003/0121637 A1 | 7/2003 | Lee | |
| 2004/0069456 A1 * | 4/2004 | Lang et al. | 165/104.17 |
| 2006/0175040 A1 * | 8/2006 | Waseda et al. | 165/67 |
| 2008/0202738 A1 * | 8/2008 | Nelson et al. | 165/174 |

FOREIGN PATENT DOCUMENTS

| | | |
|---|---|---|
| DE | 19907250 | 8/2000 |
| DE | 10 242069 | 3/2004 |
| DE | 10242069 | 3/2004 |
| DE | 10242463 | 3/2004 |
| DE | 10242463 A1 * | 3/2004 |
| DE | 103 06048 | 9/2004 |
| DE | 10306048 | 9/2004 |
| DE | 10 2005 014742 | 4/2006 |
| DE | 102005014742 | 4/2006 |
| DE | 10 2005 039672 | 3/2007 |
| DE | 10 2005 040865 A1 | 3/2007 |
| DE | 102005039672 | 3/2007 |
| EP | 001 0819 | 5/1980 |
| EP | 0010819 | 5/1980 |
| EP | 040 5613 | 1/1991 |
| EP | 0405613 | 1/1991 |
| EP | 060 1379 | 6/1994 |
| EP | 0601379 | 6/1994 |
| EP | 092 1365 | 6/1999 |
| EP | 0921365 | 6/1999 |
| EP | 161 0082 | 12/2005 |
| EP | 1610082 | 12/2005 |
| GB | 2 162 302 | 1/1986 |
| GB | 216 2302 | 1/1986 |
| JP | 631 61389 | 7/1988 |
| JP | 63161389 | 7/1988 |
| JP | 2000 220978 A | 8/2000 |
| JP | 2000-320990 A | 11/2000 |
| JP | 2003 336 974 | 11/2003 |
| JP | 2003336974 | 11/2003 |
| JP | 06-323253 A | 11/2006 |
| JP | 08-247580 A | 10/2008 |
| WO | WO 0134 907 | 5/2001 |
| WO | WO 2005012791 A1 * | 2/2005 |
| WO | WO 2007/025511 A1 | 3/2007 |

* cited by examiner

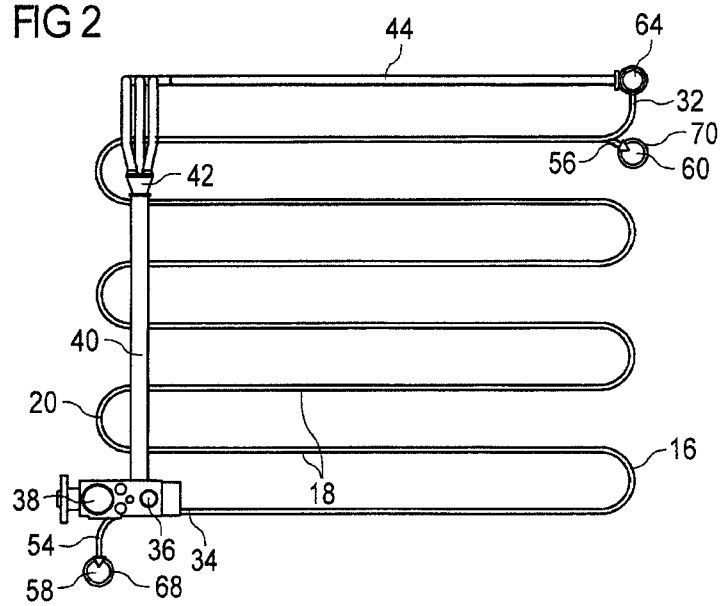
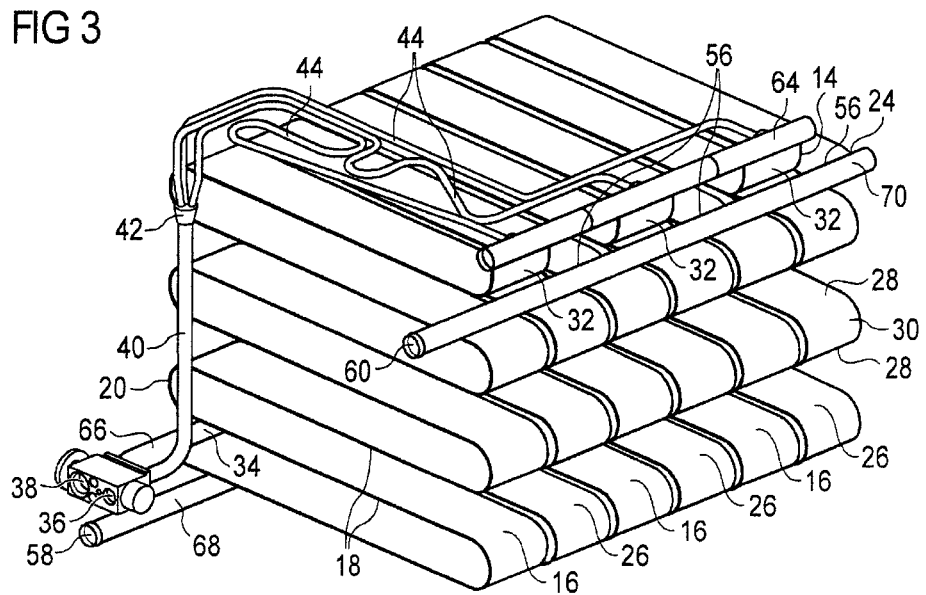

COLD AND/OR HEAT ACCUMULATOR

This application is a 35 U.S.C. §371 National Stage entry of PCT/DE2006/000922, filed May 29, 2006, the contents of which are herein incorporated by reference.

FIELD OF THE INVENTION

The invention relates to a cold and/or heat accumulator comprising a plurality of carrier elements charged with a cold or heat storage medium and at least one first heat exchanger provided to be perfused by a first heat transfer medium and comprising at least one first serpentine-shaped hollow profile, wherein at least one carrier element is arranged at least between some of the first serpentines respectively formed by two adjacent first limbs and a first connecting zone.

The invention further relates to a cold and/or heat accumulator comprising a plurality of carrier elements charged with a cold or heat storage medium and at least one first heat exchanger provided to be perfused by a first heat transfer medium and comprising at least two first serpentine-shaped hollow profiles arranged adjacent to each other, the respectively one end portion of said hollow profiles being connected to a first common heat transfer medium inlet and the respectively other end portion being connected to a first common heat transfer medium outlet.

Above that the invention relates to a cold and/or heat accumulator comprising a plurality of carrier elements charged with a cold or heat storage medium and at least one first heat exchanger provided to be perfused by a first heat transfer medium and comprising at least one first serpentine-shaped hollow profile, one end portion of which is connected to a first heat transfer medium inlet while the other end portion is connected to a first heat transfer medium outlet.

The invention also relates to a cold and/or heat accumulator comprising a plurality of carrier elements charged with a cold or heat storage medium, at least one first heat exchanger provided to be perfused by a first refrigerant, and a second heat exchanger provided to be perfused by a second heat transfer medium.

The invention further relates to a cold and/or heat accumulator comprising a housing in which at least one carrier element charged with a cold or heat storage medium and at least one first heat exchanger are arranged.

BACKGROUND OF THE INVENTION

Cold and/or heat accumulators of the type mentioned above are known from the DE 102 42 069 B4, the disclosed content of which is included in this document by the present reference. Such cold and/or heat accumulators may, for example, be used in connection with the air conditioning of motor vehicles, particularly for an engine-independent air conditioning.

The invention is based on the object to further develop the cold and/or heat accumulators known from the DE 102 42 069 B4 so that better properties are obtained with respect to the heat conductivity, the charging times, the cooling or heating performance, the distribution of the first heat transfer medium, particularly if it is a refrigerant, and the stability of the cold and/or heat accumulator, particularly in case of vibrations. Further the accumulation of oil in the first heat exchanger is to be prevented if the heat transfer medium flowing through it is a refrigerant.

SUMMARY OF THE INVENTION

According to a first aspect the present invention provides a cold and/or heat accumulator comprising a plurality of carrier elements charged with a cold or heat storage medium and at least one first heat exchanger provided to be perfused by a first heat transfer medium and comprising at least one first serpentine-shaped hollow profile, wherein at least one carrier element is arranged between at least some of the first serpentines respectively formed by two adjacent first limbs and a first connecting zone, wherein, according to the invention, the carrier elements are formed by a plurality of carrier element strips which are orientated substantially perpendicular to the first limbs. The carrier elements may, in particular, be graphite elements, wherein the heat storage medium is, preferably, a phase change material such as, for example, water or paraffin. If graphite strips are used as carrier element strips the heat conductivity can, for example, be increased from 5 W/mK to 30 W/mK as compared to the utilisation of graphite plates. A better heat conductivity leads to distinctly shorter charging times of the cold and/or heat accumulator and is therefore particularly advantageous.

In connection with the first aspect of the invention it is preferred that the carrier element strips are orientated substantially parallel to the first connecting zones. If the first serpentine-shaped hollow profile has spring-elastic properties, a friction-locked interconnection of preferably a plurality of first serpentine-shaped hollow profiles and the carrier element strips can be formed in a simple manner, similar to the one described in the DE 102 42 069 B4 for plate-shaped carrier elements.

In connection with the first aspect of the invention it is further considered advantageous for the cold and/or heat accumulator that it comprises a second heat exchanger provided to be perfused by a second heat transfer medium and comprising at least one second serpentine-shaped hollow profile, wherein the carrier element strips are further arranged at least between some of the second serpentines respectively formed by two adjacent second limbs and a second connecting zone. Even though in principle solutions in which only one heat exchanger is provided through which the cold and/or heat accumulator is charged as well as discharged are also possible, the use of separate heat exchangers for charging and discharging is advantageous for several reasons. In the vast majority of all cases a compression refrigeration cycle is present anyway so that it is advantageous to charge the cold and/or heat accumulator with cooling energy by means of an expansion of a compressed refrigerant. The first heat exchanger may therefore advantageously assume the function of an evaporator, wherein, if required, one or more expansion valves may be present if the first heat transfer medium is a refrigerant. In case of motor vehicles, for example, usually further a brine cycle is provided which is a component of the cooling and heating system. If brine is used as the second heat transfer medium and the second heat exchanger can be coupled to the cooling or heating system in an appropriate manner it is, for example, possible to discharge the cold and/or heat accumulator via the heating system. This applies to a case in which cooling energy is stored in the cold and/or heat accumulator as well as for a case in which heat is stored. A charging of the cold and/or heat accumulator with heat may also be effected via the heating system.

A further embodiment within the framework of the first aspect of the invention is that the surface of the first heat exchanger effective for the heat exchange is smaller than the surface of the second heat exchanger effective for the heat exchange. If, for example, the first heat exchanger is formed by a plurality of first serpentine-shaped hollow profiles arranged adjacent to each other and the second heat exchanger is formed by a plurality of second serpentine-shaped hollow profiles arranged adjacent to each other and preferably between the first hollow profiles the number of the first serpentine-shaped hollow profiles may be smaller than that of the second serpentine-shaped hollow profiles. In any case the purpose of this measure is the capability of getting the stored cooling energy or heat to the place where it is needed as rapidly as possible. The effective surface of the first heat exchanger is, due to space restrictions, selected so that it is as small as possible, yet large enough to enable, for example, an efficient and sufficiently rapid charging via a refrigerant.

Another preferred further development included in the framework of the first aspect of the invention contemplates that the first heat exchanger comprises at least two first serpentine-shaped hollow profiles arranged adjacent to each other, the respectively one end portion of said hollow profiles being connected to a first common heat transfer medium inlet while the respectively other end portion is connected to a first common heat transfer medium outlet, and that the connection between the one end portions and the first common heat transfer medium inlet is substantially established via interconnecting lines of the same length. If, for example, a refrigerant is used as the first heat transfer medium it can be ensured by this measure that the at least two, however, preferably more first serpentine-shaped hollow profiles are uniformly supplied with refrigerant with respect to the amount as well as with respect to the pressure so that all first hollow profiles can be optimally used, for example when being charged with cooling energy, which leads to a uniform distribution of the cooling energy inside of the cold and/or heat accumulator.

According to another embodiment of the cold and/or heat accumulator it may, within the framework of the first aspect of the invention, be contemplated that an end portion of the first serpentine-shaped hollow profile is connected to a first heat transfer medium inlet and the other end portion of the first serpentine-shaped hollow profile is connected to a first heat transfer medium outlet, and that the one end portion of the first serpentine-shaped hollow profiles is, with respect to the intended installation position, located higher than the other end portion of the first serpentine-shaped hollow profile. This solution is particularly advantageous if a refrigerant is used as a first heat transfer medium since a refrigerant flow from the top to the bottom results in a secure prevention of an accumulation of oil in the first heat exchanger.

Within the framework of the first aspect of the invention it is further preferred for the cold and/or heat accumulator that it comprises a housing in which at least the carrier elements and the first heat exchanger are disposed and that the carrier elements and the first heat exchanger are disposed on a carrier plate also provided in the housing and comprising fixation means extending to the outside of the housing. The background of this measure is that cavities inside of the housing are preferably foamed using an insulating foam so that the entire interconnection of heat exchanger(s) and carrier elements is fully surrounded by a foamed material. To ensure this the carrier plate is arranged in a corresponding distance to the housing, for example by means of suitable spacers. The fixation elements protruding from the housing, for example screws or stud bolts, ensure that the interconnection of the heat exchanger(s) and the carrier elements can be directly fixed at the target position, for example in the vehicle. If the fixation was only effected indirectly via the housing, for example, vibrations could result in oscillations of the interconnection of heat exchanger(s) and carrier elements inside of the housing which, for example, might lead to irritating noises or a detachment of connections.

According to a second aspect the present invention provides a cold and/or heat accumulator comprising a plurality of carrier elements charged with a cold or heat storage medium and at least one first heat exchanger provided to be perfused by a first heat transfer medium and comprising at least two first serpentine-shaped hollow profiles arranged adjacent to each other, the respectively one end portion of said hollow profile being connected to a first common heat transfer medium inlet while the respectively other end portion is connected to a first common heat transfer medium outlet, wherein it is, according to the invention, contemplated that the connection between the one end portions and the first common heat transfer medium inlet is established via interconnecting lines having substantially the same length. If, for example, a refrigerant is used as the first heat transfer medium it may, using this measure, be ensured, also within the framework of the second aspect of the invention, that the at least two, however, preferably more first serpentine-shaped hollow profiles are uniformly supplied with the refrigerant with respect to the amount as well as with respect to the pressure so that all first hollow profiles can be optimally used, for example, when charged with cooling energy, which leads to a uniform cooling energy distribution inside of the cold and/or heat accumulator.

In connection with the second aspect of the invention the cold and/or heat accumulator is preferably substantially cubic and the first common heat transfer medium inlet is arranged in the area of an edge of the cuboid. The arrangement of the first common heat transfer medium inlet in the area of a cuboid edge results in a particularly good accessibility of the heat transfer medium inlet, on the other hand, however, leads to different distances between the first common heat transfer medium inlet and the one end portions of the first serpentine-shaped hollow profiles. Said different distances, however, have no detrimental effect if the interconnecting lines are still of the same length.

In view of the second aspect of the invention it is particularly preferable that the interconnecting lines comprise a common interconnection line section, a distributor and individual connection lines. In this regard, the individual connection lines are preferably bent in a different way while having the same length to compensate the different distances between the first common heat transfer medium inlet and the one end portions of the first serpentine-shaped hollow profiles.

In connection with the second aspect of the invention it is further considered advantageous that the distributor is a Venturi distributor. The Venturi distributor preferably connects the common interconnection line section to the individual connection lines, wherein the Venturi distributor may comprise a throttle in the form of a bottleneck so that the cross section of the section of the common interconnection line upstream of the throttle as well as the total of the cross sections of the individual connection lines are larger than the cross section of the bottleneck. In this way a particularly uniform distribution of the first heat transfer medium formed, for example, by a refrigerant to the individual connection lines and thus to the first serpentine-shaped hollow profiles is obtained.

According to another further development provided within the framework of the second aspect of the invention it is contemplated that the common interconnection line section extends substantially vertically with respect to the intended installation position. Particularly when a Venturi distributor is located downstream of the common interconnection line section this solution will have the effect that the Venturi distributor is preceded by a straight common interconnection line section which has a positive effect on a uniform distribution of the first heat transfer medium.

As mentioned, it is, also within the framework of the second aspect of the invention, preferred that the first heat transfer medium is a refrigerant.

In view of the second aspect of the invention it is further preferred that the cold and/or heat accumulator comprises a second heat exchanger provided to be perfused by a second heat transfer medium and comprising at least two second serpentine-shaped hollow profiles arranged adjacent to each other, the respectively one end portion of said hollow profiles being connected to a second common heat transfer medium inlet while the respectively other end portion is connected to a second common heat transfer medium outlet. Even though, as mentioned, principally solutions are feasible in which only one heat exchanger is provided via which the cold and/or heat accumulator is charged as well as discharged the utilisation of separate heat exchangers for charging and discharging is advantageous for several reasons. In the vast majority of all cases a compression refrigeration cycle is present anyway so that it is advantageous to charge the cold and/or heat accumulator with cooling energy by means of an expansion of a compressed refrigerant. The first heat exchanger may therefore assume the function of an evaporator in an advantageous manner, wherein, if required, one or more expansion valves may be provided if the first heat transfer medium is a refrigerant. In case of motor vehicles, for example, usually a further brine cycle is present which is a component of the cooling and heating system. If brine is used as the second heat transfer medium and the second heat exchanger can be coupled to the cooling or heating system in an appropriate manner it is, for example, possible to discharge the cold and/or heat accumulator via the heating system. This applies to a case in which cooling energy is stored in the cold and/or heat accumulator as well as to a case in which heat is stored. A charging of the cold and/or heat accumulator with heat may also be effected via the heating system.

In the context discussed above it may further be advantageous that the surface of the first heat exchanger effective for the heat exchange is smaller than the surface of the second heat exchanger effective for the heat exchange. If the first heat exchanger is formed by a plurality of serpentine-shaped first hollow profiles arranged adjacent to each other and the second heat exchanger is formed by a plurality of second serpentine-shaped hollow profiles arranged adjacent to each other and preferably between the first hollow profiles, the number of the first serpentine-shaped hollow profiles may be smaller than that of the second serpentine-shaped hollow profiles in this case as well. In this case also the purpose of this measure is the capability of transporting the stored cooling energy or heat to the place where it is needed as fast as possible. The effective surface of the first heat exchanger is, due to space restrictions, selected so that it is as small as possible yet large enough so that, for example, an efficient and sufficiently rapid charging via a refrigerant is possible.

Within the framework of the second aspect of the invention it is also preferred that the second heat transfer medium is brine. In this way, for example, the coupling to the heater circuit of a motor vehicle is possible in a particularly simple manner.

According to another further development also preferred in connection with the second aspect of the invention it is contemplated that at least one carrier element is disposed at least between some of the first serpentines respectively formed by two adjacent first limbs and a first connecting zone and that the carrier elements are formed by a plurality of carrier element strips orientated substantially perpendicular to the first limbs. In this case as well the carrier elements may, in particular, be graphite elements, the heat storage medium preferably being a phase change material like, for example, water or paraffin. If graphite strips are used as carrier element strips, the heat conductivity can, for example, be increased from 5 W/mK to 30 W/mK as compared to the utilisation of graphite plates. A better heat conductivity leads to distinctly shorter charging times of the cold and/or heat accumulator and is therefore particularly advantageous.

Within the framework of the second aspect of the invention it is also preferred that respectively one end portion of the first serpentine-shaped hollow profiles is connected to a first common heat transfer medium inlet, that a respectively other end portion of the first serpentine-shaped hollow profiles is connected to a first common heat transfer medium outlet, and that the one end portions of the first serpentine-shaped hollow profiles are located higher than the other end portions the first serpentine-shaped hollow profiles with respect to the intended installation position. As mentioned this solution is particularly advantageous when a refrigerant is used as the first heat transfer medium since a refrigerant flow from the top to the bottom enables a secure prevention of an oil accumulation in the first heat exchanger.

According to a variant of the cold and/or heat accumulator also preferred in connection with the second aspect it is contemplated that it comprises a housing in which at least the carrier elements and the first heat exchanger are disposed, and that the carrier elements and the first heat exchanger are arranged on a carrier plate also provided in the housing and comprising fixation means extending to the outside of the housing. The background of this measure is, in this case as well, that cavities inside of the housing are preferably foamed using an insulating foam so that the entire interconnection of the heat exchanger(s) and the carrier elements is completely surrounded by a foamed material. To ensure this the carrier plate is disposed in a corresponding distance to the housing, for example by means of suitable spacers. The fixation elements extending to the outside of the housing, for example screws or stud bolts, ensure that the interconnection of heat exchanger(s) and carrier elements can be directly fixed in the target position, for example, in the vehicle. If the fixation was only effected indirectly via the housing, vibrations, for example, could result in oscillations of the interconnection of the heat exchanger(s) and the carrier elements within the housing which could, for example, lead to irritating noises or loosening connections.

According to a third aspect the present invention provides a cold and/or heat accumulator comprising a plurality of carrier elements charged with a cold or heat storage medium and at least one first heat exchanger provided to be perfused by a first heat transfer medium and comprising at least one first serpentine-shaped hollow profile, one end portion of which is connected to a first heat transfer medium inlet while the other end portion is connected to a first heat transfer medium outlet, wherein it is, according to the invention, contemplated that the one end portion of the first serpentine-shaped hollow profile is located higher than the other end portion of the first serpentine-shaped hollow profile with respect to the intended installation position. For example when a refrigerant is used as the first heat transfer medium, since a refrigerant flow from the top to the bottom enables a secure prevention of an accumulation of oil in the first heat exchanger.

Within the framework of the third aspect of the invention it is therefore preferred that the first heat transfer medium is a refrigerant. In this way the cold and/or heat accumulator can be integrated in a compression refrigeration cycle possibly provided anyway in a particularly simple manner.

Within the framework of the third aspect of the invention it is also considered advantageous that the cold and/or heat accumulator comprises a second heat exchanger provided to be perfused by a second heat transfer medium and comprising at least one second serpentine-shaped hollow profile, one end portion of which is connected to a second heat transfer medium inlet while the other end portion is connected to a second heat transfer medium outlet. Even though, as mentioned, principally solutions are feasible according to which only one heat exchanger is provided via which the cold and/or heat accumulator is charged as well as discharged, the utilisation of separate heat exchangers for charging and discharging is advantageous for several reasons. In the vast majority of all cases a compression refrigeration cycle is provided anyway so that it is advantageous to charge the cold and/or heat accumulator with cooling energy by means of an expansion of a compressed refrigerant. The first heat exchanger may therefore advantageously assume the function of an evaporator, wherein, if required, one or more expansion valves may be provided if the first heat transfer medium is a refrigerant. In case of, for example, motor vehicles usually further a brine cycle is provided which is a component of the cooling and heating system. If brine is used as the second heat transfer medium and the second heat exchanger can be coupled to the cooling or heating system in an appropriate manner, it is, for example, possible to discharge the cold and/or heat accumulator via the heating system. This applies to cases in which cooling energy is stored in the cold and/or heat accumulator as well as to cases in which heat is stored. The charging of the cold and/or heat accumulator with heat may also be effected via the heating system.

Also within the framework of the third aspect of the invention an advantageous further development of the cold and/or heat accumulator contemplates that the one end portion of the second serpentine-shaped hollow profile is located lower than the other end portion of the second serpentine-shaped hollow profile with respect to the intended installation position. As mentioned, this solution is particularly advantageous if a refrigerant is used as the first heat transfer medium since a refrigerant flow from the top to the bottom enables a secure prevention of an accumulation of oil in the first heat exchanger.

In the context discussed above it is considered advantageous that the second heat transfer medium is brine. As mentioned, for example, the coupling to the heater circuit of a motor vehicle is possible in a particularly simple manner in this way.

According to an embodiment of the cold and/or heat accumulator also advantageous within the framework of the third aspect of the invention, it is contemplated that the surface of the first heat exchanger effective for the heat exchange is smaller than the surface of the second heat exchanger effective for the heat exchange. If the first heat exchanger is formed by a plurality of serpentine-shaped first hollow profiles arranged adjacent to each other and the second heat exchanger is formed by several serpentine-shaped hollow profiles arranged adjacent to each other and preferably between the first hollow profiles, the number of the first serpentine-shaped hollow profiles may, in this case as well, be smaller than that of the second serpentine-shaped hollow profiles. In this case as well the purpose of this measure is the capability of transporting the stored cooling energy or heat to the place where it is needed as fast as possible. The effective surface of the first heat exchanger is, due to space restrictions, selected so that it is as small as possible, however, sufficiently large so that, for example, an efficient and sufficiently rapid charging is possible via the refrigerant.

In preferred embodiments of the cold and/or heat accumulator it is contemplated, also in connection with the third aspect of the invention, that at least one carrier element is arranged at least between some of the first serpentines of the first heat exchanger respectively formed by two adjacent first limbs and a first connecting zone and that the carrier elements are formed by a plurality of carrier element strips orientated substantially perpendicular to the first limbs. The carrier elements may, in particular, be graphite elements in this case as well, the heat storage medium preferably being a phase change material such as, for example, water or paraffin. If graphite strips are used as the carrier element strips the heat conductivity can, for example, be increased from 5 W/mK to 30 W/mK as compared to the utilisation of graphite plates. A better heat conductivity will lead to distinctly shorter charging times of the cold and/or heat accumulator and is therefore particularly advantageous.

Within the framework of the third aspect of the invention it is also preferred that the first heat exchanger comprises at least two first serpentine-shaped hollow profiles arranged adjacent to each other, the respectively one end portion of said hollow profiles being connected to a first common heat transfer medium inlet while the respectively other end portion is connected to a first common heat transfer medium outlet, and that the connection between the one end portions and the first common heat transfer medium inlet is established via interconnecting lines of substantially equal lengths. If, for example, a refrigerant is used as the first heat transfer medium it may, also within the framework of the third aspect of the invention, be ensured by this measure that the at least two, however, preferably more first serpentine-shaped hollow profiles are uniformly supplied with refrigerant with respect to the amount as well as with respect to the pressure so that all of the first hollow profiles may be optimally used, for example while being charged with cooling energy, which will result in a uniform distribution of the cooling energy within the cold and/or heat accumulator.

With respect to the third aspect of the invention it is again preferred that the cold and/or heat accumulator comprises a housing in which at least the carrier elements and the first heat exchanger are arranged, and that the carrier elements and the first heat exchanger are arranged on a carrier plate also provided in the housing and comprising fixation means extending to the outside of the housing. The background of this measure, also in connection with the third aspect of the invention, is that cavities inside of the housing are preferably foamed using an insulating foam so that the entire interconnection of heat exchanger(s) and carrier elements is entirely surrounded by a foamed material. To ensure this the carrier plate is arranged in a corresponding distance to the housing, for example by means of suitable spacers. The fixation elements extending to the outside of the housing, for example screws or stud bolts, ensure that the interconnection of heat exchanger(s) and carrier elements can be fixed directly at the target position, for example in the vehicle. If the fixation was only effected indirectly via the housing, for example, vibrations might lead to an oscillation of the interconnection of the heat exchanger(s) and the carrier elements inside of the housing which might, for example, cause irritating noises or a detachment of connections.

According to a fourth aspect the present invention provides a cold and/or heat accumulator comprising a plurality of carrier elements charged with a cold or heat storage medium, at least one first heat exchanger provided to be perfused by a first refrigerant and a second heat exchanger provided to be perfused by a second heat transfer medium, wherein it is, according to the invention, contemplated that the surface of the first heat exchanger effective for the heat exchange is smaller than the surface of the second heat exchanger effective for the heat exchange. The purpose of this measure is the capability of transporting the stored cooling energy or heat to the place where it is needed as fast as possible. The effective surface of the first heat exchanger is, due to space restrictions, selected so that it is as small as possible, however, large enough that, for example, an efficient and sufficiently rapid charging via a refrigerant is possible.

Within the framework of the fourth aspect of the invention it is also preferred that the first heat exchanger comprises at least one first serpentine-shaped hollow profile, at least one carrier element being arranged at least between some of the first serpentines respectively formed by two adjacent first limbs and a first connecting zone. If the first serpentine-shaped hollow profile comprises spring-elastic properties, a friction-locked interconnection of the first heat exchanger and the carrier elements may be established in this way as discussed in the DE 102 42 069 B4.

In the context explained above it is further considered advantageous that the second heat exchanger comprises at least one second serpentine-shaped hollow profile, at least one carrier element being arranged at least between some of the second serpentines respectively formed by two adjacent second limbs and a second connecting zone. If the second serpentine-shaped hollow profile also comprises spring-elastic properties the second heat exchanger may be integrated in the interconnection of the first heat exchanger and the carrier elements in a simple manner.

A further development of the cold and/or heat accumulator advantageous within the framework of the fourth aspect of the invention contemplates that a smaller number of first serpentine-shaped hollow profiles than of second serpentine-shaped hollow profiles is provided. With this measure it is possible to keep the surface of the first heat exchanger effective for the heat exchange smaller than the surface of the second heat exchanger effective for the heat exchange in a simple manner.

In connection with the fourth aspect of the invention it is also preferred that at least one carrier element is arranged between at least some of the first serpentines of the first heat exchanger respectively formed by two adjacent first limbs and a first connecting zone, and that the carrier elements are formed by a plurality of carrier element strips orientated substantially perpendicular to the first limbs. The carrier elements may, in particular, be graphite elements again, the heat storage medium preferably being a phase change material such as, for example, water or paraffin. If graphite strips are used as carrier element strips, the heat conductivity may, for example, be increased from 5 W/mK to 30 W/mK as compared to the utilisation of graphite plates. A better heat conductivity will lead to distinctly shorter charging times of the cold and/or heat accumulators and is therefore particularly advantageous.

A further development of the cold and/or heat accumulator advantageous also in view of the fourth aspect of the invention contemplates that the first heat exchanger comprises at least two first serpentine-shaped hollow profiles arranged adjacent to each other, one end portion of which is respectively connected to a first common heat transfer medium inlet while the respectively other end portion is connected to a first common heat transfer medium outlet, and that the connection between the one end portions and the first common heat transfer medium inlet is established via interconnecting lines having substantially the same length. Particularly when a refrigerant is used as a first heat transfer medium it may, also within the framework of the fourth aspect of the invention, be ensured with this measure that the at least two, however, preferably more first serpentine-shaped hollow profiles are uniformly supplied with refrigerant with respect to the amount as well as with respect to the pressure so that all first hollow profiles can be optimally used, for example, while being charged with cooling energy, which leads to a uniform distribution of the cooling energy inside the cold and/or heat accumulator.

It is further preferred, also within the framework of the fourth aspect of the invention, that the first heat accumulator comprises at least one first serpentine-shaped hollow profile, one end portion of which is connected to a first heat transfer medium inlet while the other end portion is connected to a first heat transfer medium outlet and that the one end portion of the first serpentine-shaped hollow profile is located higher than the other end portion of the first serpentine-shaped hollow profile with respect to the intended installation position. This solution is particularly advantageous when a refrigerant is used as the first heat transfer medium since a refrigerant flow from the top to the bottom enables a secure prevention of an accumulation of oil in the first heat exchanger.

In connection with the fourth aspect of the invention it is also considered advantageous that the cold and/or heat accumulator according to the invention comprises a housing in which at least the carrier elements, the first heat exchanger and the second heat exchanger are arranged and that the carrier elements, the first heat exchanger and the second heat exchanger are arranged on a carrier plate also disposed in the housing and comprising fixation means extending to the outside of the housing. The background of this measure is that cavities inside the housing are preferably foamed using an insulating foam so that the entire interconnection of the heat exchanger(s) and the carrier element is fully surrounded by a foamed material. To ensure this the carrier plate is arranged in a corresponding distance to the housing, for example, by means of suitable spacers. The fixation elements protruding from the housing, for example screws or stud bolts, ensure that the interconnection of the heat exchanger(s) and the carrier elements can be fixed directly at the target position, for example in the vehicle. For example, if the fixation was only effected indirectly via the housing vibrations might lead to an oscillation of the interconnection of the heat exchanger(s) and the carrier elements inside of the housing which might, for example, cause irritating noises or a detachment of connections.

According to a fifth aspect the present invention provides a cold and/or heat accumulator comprising a housing in which at least one carrier element charged with a cold or heat storage medium and at least one first heat exchanger are arranged, wherein it is, according to the invention, contemplated that the at least one carrier element and the at least one heat exchanger are arranged on a carrier plate also disposed in the housing and comprising fixation means extending to the outside of the housing. The fixation elements extending to the outside of the housing, for example screws or stud bolts, ensure, in this case as well, that the interconnection of the heat exchanger(s) and the carrier elements can be fixed directly at the target position, for example in the vehicle. If the fixation was only effected indirectly via the housing, vibrations, for example, might lead to an oscillation of the interconnection of the heat exchanger(s) and the carrier elements inside of the housing, which might, for example, cause irritating noises or loosening connections.

Within the framework of the fifth aspect of the invention it is also preferred that the carrier plate is arranged in a distance from the housing. To achieve a weight reduction the carrier plate may advantageously be a perforated plate. Further the fixation elements extending to the outside of the housing may simultaneously (co-)act as spacers. For example, the fixation means may be formed by screws the position of which, relative to the housing, is defined by lock nuts.

Another further development of the cold and/or heat accumulator also preferred in connection with the fifth aspect of the invention contemplates that at least some clearances between the housing and the components arranged therein are foamed. The foaming material contributes to the thermal insulation as well as to sound attenuation here. Preferably all cavities are foamed, also the section between the carrier plate and the opposite housing bottom.

A further development of the cold and/or heat accumulator also preferred within the framework of the fifth aspect of the invention contemplates that the first heat exchanger is provided to be perfused by a first heat transfer medium, that the first heat exchanger comprises at least one first serpentine-shaped hollow profile, wherein at least one carrier element is arranged between at least some of the first serpentines respectively formed by two adjacent first limbs and a first connecting zone, and that the carrier elements are formed by a plurality of carrier element strips orientated substantially perpendicular to the first limbs. The carrier elements may, in particular, be graphite elements in this case as well, the heat storage medium preferably being a phase change material such as, for example, water or paraffin. If graphite strips are used as carrier element strips the heat conductivity can, for example, be increased from 5 W/mK to 30 W/mK as compared to the utilisation of graphite plates. A better heat conductivity leads to distinctly shorter charging times of the cold and/or heat accumulator and is therefore particularly advantageous.

With respect to the fifth aspect of the invention as well it is preferred for the cold and/or heat accumulator that the first heat exchanger is provided to be perfused by a first heat transfer medium, that the first heat exchanger comprises at least two first serpentine-shaped hollow profiles arranged adjacent to each other, the respectively one end portion of said hollow profiles being connected to a first common heat transfer medium inlet while the respectively other end portion is connected to a first common heat transfer medium outlet, and that the connection between the one end portions and the first common heat transfer medium inlet is established via interconnecting lines of substantially the same length. If, for example, a refrigerant is used as the first heat transfer medium it may, also within the framework of the fifth aspect of the invention, be ensured by this measure that the at least two, preferably, however, more first serpentine-shaped hollow profiles are uniformly supplied with the refrigerant with respect to the amount as well as with respect to the pressure so that all the first hollow profiles may be optimally used, for example while being charged with cooling energy, which leads to a uniform distribution of the cooling energy inside the cold and/or heat accumulator.

Another further development of the cold and/or heat accumulator advantageous in connection with the fifth aspect of the invention contemplates that the first heat exchanger is provided to be perfused by a first heat transfer medium, that the first heat exchanger comprises at least one first serpentine-shaped hollow profile, one end portion of which is connected to a first heat transfer medium inlet while the other end portion is connected to a first heat transfer medium outlet, and that the one end portion of the first serpentine-shaped hollow profile is located higher than the other end portion of the first serpentine-shaped hollow profile with respect to the intended installation position. This solution is particularly advantageous when a refrigerant is used as the first heat transfer medium since a refrigerant flow from the top to the bottom enables a secure prevention of an accumulation of oil in the first heat exchanger.

At least in case of some embodiments it may, also within the framework of the fifth aspect of the invention, be advantageous that the cold and/or heat accumulator comprises a second heat exchanger provided to be perfused by a second heat transfer medium, and that the surface of the first heat exchanger effective for the heat exchange is smaller than the surface of the second heat exchanger effective for the heat exchange. If, for example, the first heat exchanger is formed by a plurality of serpentine-shaped first hollow profiles arranged adjacent to each other and the second heat exchanger is formed by a plurality of second serpentine-shaped hollow profiles arranged adjacent to each other and preferably between the first hollow profiles, the number of the first serpentine-shaped hollow profiles may be smaller than that of the second serpentine-shaped hollow profiles. In any case the purpose of this measure is the capability of transporting the stored cooling energy or heat to the place where it is needed as rapidly as possible. The effective surface of the first heat exchanger is, due to space restrictions, selected so that it is as small as possible, however, large enough so that, for example, an efficient and sufficiently fast charging is possible via a refrigerant.

BRIEF DESCRIPTION OF THE DRAWINGS

FIG. 2 shows a side view of the arrangement of a first heat exchanger and a second heat exchanger used in the cold and/or heat accumulator according to FIG. 1; and FIG. 3 shows a perspective view of the arrangement of a first heat exchanger and a second heat exchanger used in the cold and/or heat accumulator according to FIG. 1.

DESCRIPTION OF A PREFERRED EMBODIMENT

Figure 1:
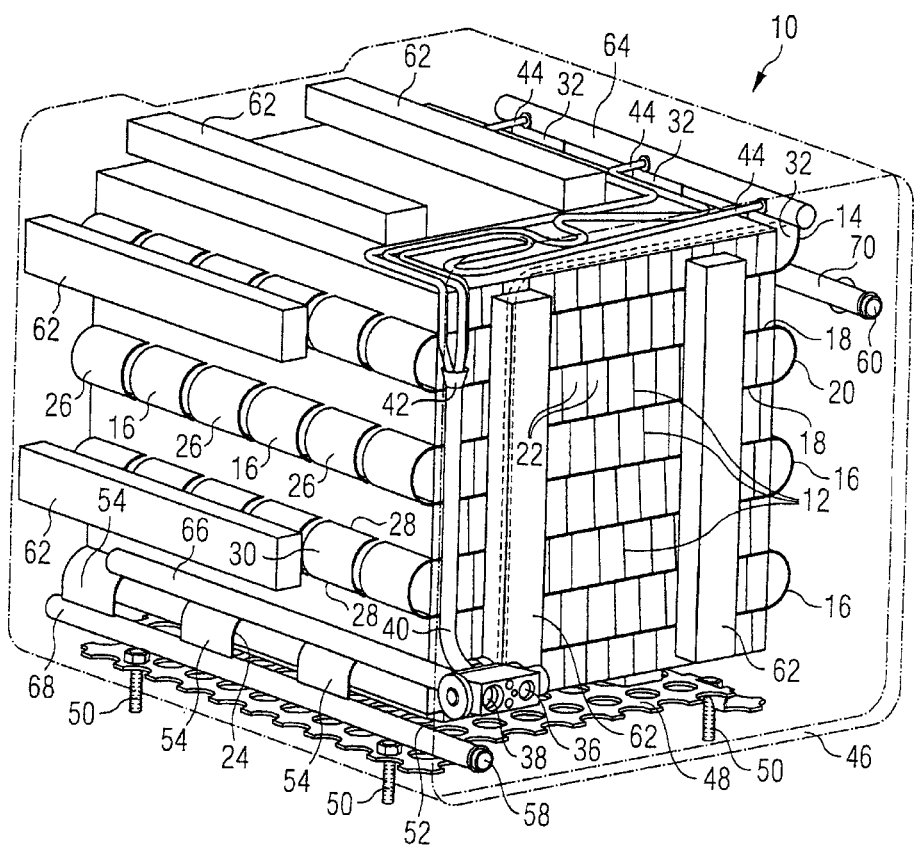
FIG. 1 shows a perspective illustration of an embodiment of the cold and/or heat accumulator according to the invention.

In the following, FIGS. 1 to 3 are commonly made reference to, it being understood that some components or sections of components are not recognisable in all of the figures.

The cold and/or heat accumulator 10 shown in FIG. 1 comprises a housing 46 only shown transparently and indicated by dot-chain-lines. In the housing 46 a first heat exchanger 14 and a second heat exchanger 24 are arranged on a carrier plate 48 which, with respect to the illustration of FIG. 1, is provided in a distance to the bottom of the housing 46. In the illustrated case the first heat exchanger 14 comprises three first serpentine-shaped hollow profiles 16 disposed adjacent to each other in such a distance to each other that second serpentine-shaped hollow profiles 26 of the second heat exchanger 24 can extend between them. Between the first serpentines respectively formed by two adjacent first limbs 18 and a first connecting zone 20 and between the second serpentines respectively formed by two adjacent second limbs 28 and a second connecting zone 30, carrier elements 12 charged with a cold or heat storage medium are arranged. It is noted that as shown in FIG. 1, the carrier element strips 12 have an elongated shape in the direction from one of the two adjacent first limbs 18 towards the other of the two adjacent first limbs 18. The carrier elements 12 are formed by a plurality of carrier element strips 22 extending substantially perpendicular to the first limbs 18 and the second limbs 28 so that the carrier element strips 22 are orientated substantially parallel to the first connecting zones 20 and the second connecting zones 30. The first hollow profiles 16 and the second hollow profiles 26 preferably comprise spring-elastic properties so that a friction-locked interconnection of the carrier elements 12 and of the first heat exchanger 14 as well as of the second heat exchanger 24 is established as described in detail in the DE 102 420 69 B4.

As carrier element strips 22 particularly graphite strips are feasible, the heat storage medium preferably being a phase change material such as, for example, water or paraffin. If graphite strips are used as carrier element strips 22, the heat conductivity may, for example, be increased from 5 W/mK to 30 W/mK as compared to the utilisation of graphite plates. A better heat conductivity will lead to distinctly shorter charging times of the cold and/or heat accumulator 10 and is therefore particularly advantageous.

The one end portions 32 of the first serpentine-shaped hollow profiles 16 are connected to a first common heat transfer medium inlet 36 via individual connection lines 44, a distributor 42 and a common interconnection line section 40. Between the one end portions 32 of the first serpentine-shaped hollow profiles 16 and the individual connection lines 44, an inlet rod 64 is provided which serves to stabilise the arrangement without connecting the one end portions 32 of the first serpentine-shaped hollow profiles 16 to each other. Even though the distances between the first common heat transfer medium inlet 36 and the one end portions 32 of the three first serpentine-shaped hollow profiles 16 have different lengths, the connection between the one end portions 32 and the first common heat transfer medium inlet 36 is, altogether, established via interconnecting lines having the same lengths. For this purpose all individual connection lines 44 have the same lengths but are bent differently. Between the common interconnection line section 40 and the individual connection lines 44 a distributor 42 in the form of a Venturi distributor is provided. The Venturi distributor 42 may, in its interior, include a throttle in the form of a bottleneck so that the cross section of the common interconnection line section 40 located upstream of the throttle as well as the sum of the cross sections of the individual connection lines 44 are larger than the cross section of the bottleneck. Owing to the type of distributor 42 and the interconnecting lines having the same lengths, a with respect to the amount as well as with respect to the pressure, uniform supply of the first serpentine-shaped hollow profiles 16 with the first heat transfer medium is obtained which medium may, in particular, be a refrigerant. If the first heat transfer medium is supplied to the first common heat transfer medium inlet 36 in the form of a compressed refrigerant, the first heat exchanger 14 may serve as an evaporator for charging the cold and/or heat accumulator 10 with cooling energy.

The other end portions 34 of the first serpentine-shaped hollow profiles 16 are connected to a first common heat transfer medium outlet 38 via a first outlet pipe 66. The first common heat transfer medium inlet 36 and the first common heat transfer medium outlet 38 are located adjacent to each other inside of a coupling element, namely in the area of a corner of the cubic housing 46. In this connection it is evident that the first common heat transfer medium inlet 36 and the first common heat transfer medium outlet 38 are preferably accessible from the outside, for example via a suitable opening in the housing 46. This arrangement of the first common heat transfer medium inlet 36, among other things, renders it possible that the first common interconnection line section 40 extends parallel to a cuboid edge 52, i.e. straight with respect to the distributor 42, which also contributes to a uniform distribution of the first heat transfer medium.

In the embodiment shown the one end portions 32 of the first serpentine-shaped hollow profiles 16 serving as an inlet are positioned higher than the other end portions 34 of the first serpentine-shaped hollow profiles 16 with respect to the final installation position of the cold and/or heat accumulator 10. In this way the first heat exchanger 14 is perfused by the first heat transfer medium from the top to the bottom. Particularly when the first heat transfer medium is a refrigerant this solution will prevent oil from accumulating in the first heat exchanger 14.

The second heat transfer medium 24 is provided to be perfused by a second heat transfer medium which is preferably brine. For this purpose the one end portions 54 of the second serpentine-shaped hollow profiles 26 are connected to a second common heat transfer medium inlet 58 via an inlet pipe 68. The other end portions 56 of the second serpentine-shaped hollow profiles 26 are connected to a second common heat transfer medium outlet 60 via a second outlet pipe 70 so that the second heat exchanger 24 is perfused from the bottom to the top. If the first heat transfer medium is a refrigerant and the second heat transfer medium is brine and the refrigerant is used for charging the cold and/or heat accumulator 10 with cooling energy and the brine is used for discharging the cold and/or heat accumulator 10, the cold and/or heat accumulator 10 is charged and discharged in a counterflow process. Among other things this contributes to the fact that a difference between the current temperature of the second heat transfer medium and the current temperature of the immediately adjacent cold or heat storage medium is always as large as possible.

Even though this is not shown it may, in some cases, be advantageous when the surface of the first heat exchanger 14 effective for the heat exchange is smaller than the surface of the second heat exchanger 24 effective for the heat exchange, for example by providing fewer first serpentine-shaped hollow profiles 16 than second serpentine-shaped hollow profiles 26. The purpose of this measure is the capability of transporting the stored cooling energy or heat to the place where it is needed as fast as possible. The effective surface of the first heat exchanger 14 is, due to space restrictions, selected so that it is as small as possible, but sufficiently large that, for example, an efficient and sufficiently rapid charging via a refrigerant is possible.

The carrier plate 48 formed as a perforated plate comprises fixation means 50 in the form of four screws (of which only three are shown) protruding beyond the housing 46. The background of this measure is that cavities inside of the housing 46 are preferably foamed using an insulating foam so that the entire interconnection of the heat exchangers 14, 24 and the carrier elements 12 is completely surrounded by a foamed material. To ensure this, the carrier plate 48 is arranged in a corresponding distance to the housing 46, for example by means of suitable spacer elements such as nuts or the like. The fixation elements 50 extending to the outside of the housing ensure that the interconnection of the heat exchangers 14, 24 and the carrier elements 12 can be fixed directly at the target position, for example in the vehicle. If said fixation was only effected indirectly via the housing 46, vibrations, for example, might result in an oscillation of the interconnection of the heat exchangers 14, 24 and the carrier elements 12 inside of the housing 46, which might, for example, lead to irritating noises and/or, in the worst case, to a detachment of the connections. All in all the fixation of the cold and/or heat accumulator 10 according to the invention provides more integration options.

Between the interconnection of the heat exchangers 14, 24 as well as the carrier elements 12 and the housing 46 preferably elastic spacers 62 are provided which, in particular, stabilise the position of the interconnection of the heat exchangers 14, 24 as well as the carrier element 12 with respect to the housing 46 before the cavities are foamed.

The serpentine-shaped hollow profiles 16, 26 of the first heat exchanger 14 and of the second heat exchanger 24 are, in the illustrated case, formed by flat pipes, which is preferred. In this connection, however, the height of the flat pipes is preferably selected so that it is large enough to keep the pressure losses low.

The cold and/or heat accumulator according to the invention is characterised by a good heat conduction, short charging times, a high cooling or heating performance, low pressure losses as well as a better cooling agent distribution.

The features of the invention disclosed in the above description, in the drawings as well as in the claims may be important for the realisation of the invention individually or in any combination. In particular the different aspects of the invention may be combined in an advantageous manner, therefore the possible combinations not (yet) claimed or explicitly explained of the features mentioned in the claims and in the description shall also be deemed disclosed.

The invention claimed is:

1. A cold and/or heat accumulator comprising a plurality of carrier elements charged with a cold or heat storage medium and at least one first heat exchanger provided to be perfused by a first heat transfer medium and comprising at least one first serpentine-shaped hollow profile, wherein at least one carrier element is disposed between at least some of the first serpentines respectively formed by two adjacent first limbs and a first connecting zone, wherein the carrier elements are formed by a plurality of carrier element strips, and wherein each of the carrier element strips has an elongated shape in the direction from one of the two adjacent first limbs towards the other of the two adjacent first limbs.

2. The cold and/or heat accumulator of claim 1, wherein the carrier element strips are orientated substantially parallel to the first connecting zones.

3. The cold and/or heat accumulator claim 1, wherein the cold and/or heat accumulator comprises a second heat exchanger provided to be perfused by a second heat transfer medium and comprising at least one second serpentine-shaped hollow profile, wherein the carrier element strips are further arranged between at least some of the second serpentines respectively formed by two adjacent second limbs and a second connecting zone.

4. The cold and/or heat accumulator of claim 1, wherein the surface of the first heat exchanger effective for the heat exchange is smaller than the surface of the second heat exchanger effective for the heat exchange.

5. The cold and/or heat accumulator of claim 1, wherein the first heat exchanger comprises at least two first serpentine-shaped hollow profiles arranged adjacent to each other, the respectively one end portion of said hollow profiles being connected to a first common heat transfer medium inlet and the respectively other end portion being connected to a first common heat transfer medium outlet, and wherein the connection between the one end portions and the first common heat transfer medium inlet is established via interconnecting lines of substantially the same length.

6. The cold and/or heat accumulator of claim 1, wherein one end portion of the first serpentine-shaped hollow profile is connected to a first heat transfer medium inlet and the other end portion of the first serpentine-shaped hollow profile is connected to a first heat transfer medium outlet and wherein the one end portion of the first serpentine-shaped hollow profile is located higher than the other end portion of the first serpentine-shaped hollow profile with respect to an intended installation position.

7. The cold and/or heat accumulator of claim 1, wherein the cold and/or heat accumulator comprises a housing in which at least the carrier elements and the first heat exchanger are disposed, and wherein the carrier elements and the first heat exchanger are arranged on a carrier plate also provided in the housing and comprising fixation means extending to the outside of the housing.

* * * * *